United States Patent

[11] 3,586,850

| [72] | Inventor | Webster W. Curtiss<br>Route #2, Caldwell, Idaho 83605 |
|---|---|---|
| [21] | Appl. No. | 833,050 |
| [22] | Filed | June 13, 1969 |
| [45] | Patented | June 22, 1971 |

[54] FOG PENETRATOR OR SIMILAR ARTICLE
3 Claims, 4 Drawing Figs.

[52] U.S. Cl. .................................................. 240/46.03,
 240/46.17, 240/46.29, 240/46.57
[51] Int. Cl. .............................................. F21v 11/18,
 F21v 17/04
[50] Field of Search........................................ 240/46.03,
 46.05, 46.17, 46.29, 46.25, 46.23, 46.57, 46.59,
 7.1 H, 7.7

[56] References Cited
UNITED STATES PATENTS

| 1,026,703 | 5/1912 | Russell | 240/46.17 |
| 1,498,014 | 6/1924 | Cooper | 240/46.17 |
| 1,590,828 | 6/1926 | Ihris | 240/46.17 X |
| 2,388,788 | 11/1945 | Kuschel et al. | 240/7.1 |

Primary Examiner—Richard C. Queisser
Assistant Examiner—Ellis J. Koch
Attorney—John W. Kraft ABSTRACT: A roller shadelike monochromatic film sheet lens operable to diffuse and to shorten the light wavelengths of automotive vehicle head lamps, the lens being mounted to and normally carried by commonly known moveable headlamp covers of automotive vehicles. The shadelike lens is provided with a spring-loaded extensible means at one of its terminal ends which is mounted to the cover and with a slotted latching bar means suitably fastened to the cover at the terminal end opposite the extensible means, the slotted portion being operable to guide the lens therethrough and to normally hold the lens to the cover by a pair of eyelets provided at the opposite terminal end of the lens which are engageable with a locking means fixed to the headlamp housing and operable to hold the sheet in place over the headlamp when the cover is moved out of the path of the headlamp when the lens is extended.

PATENTED JUN22 1971
3,586,850
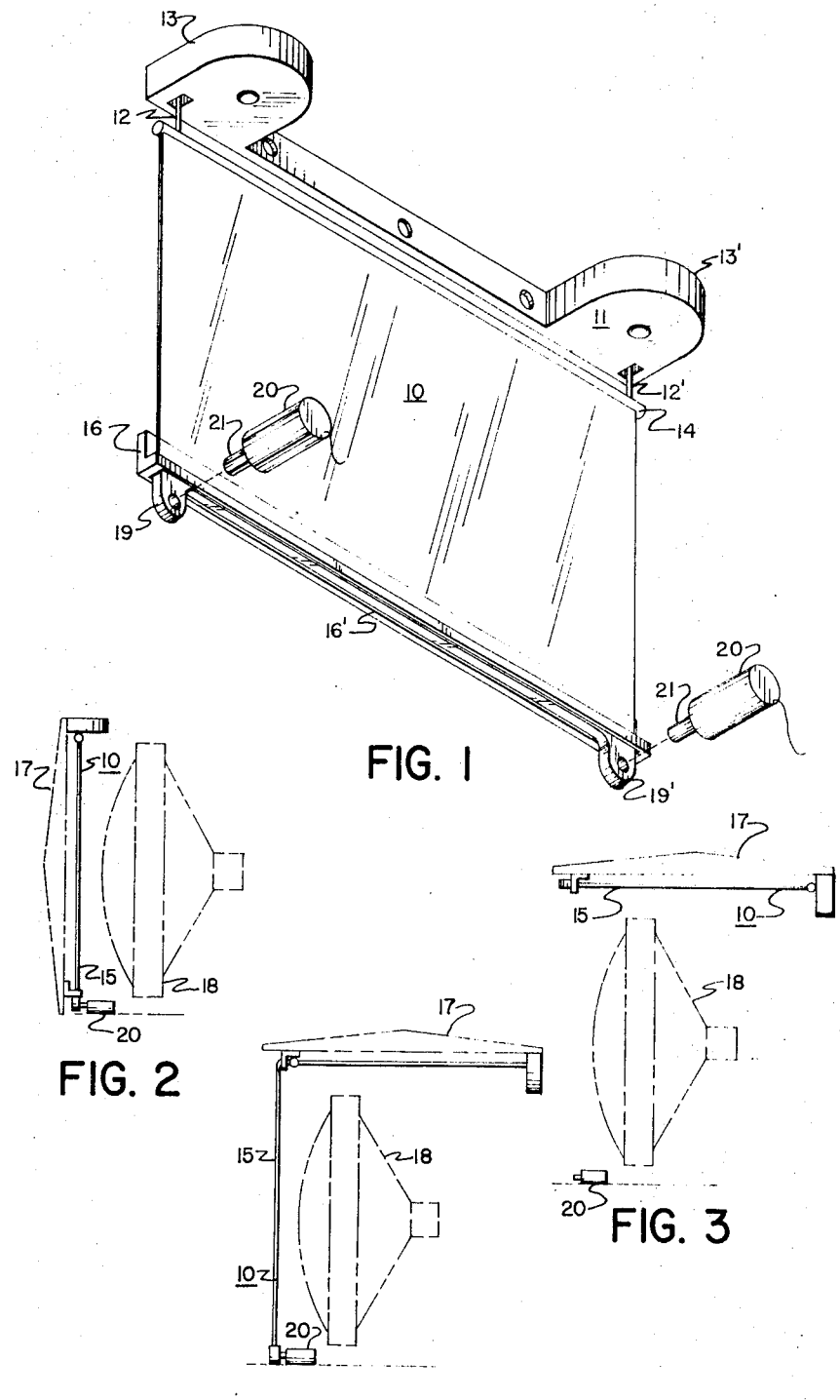
WEBSTER W. CURTISS    INVENTOR.
BY

FOG PENETRATOR OR SIMILAR ARTICLE

FIELD OF INVENTION

The present invention relates to fog lens penetrators, and more particularly to fog lens penetrators comprising a roller shadelike film sheet lens having a spring-loaded extensible means at one of its terminal ends mounted to a commonly known automotive headlamp cover and a locking bar means at its opposite terminal and engageable with a locking means fixed to an automotive headlamp housing operable to hold the sheet in place over the headlamp when the cover is moved out of the path of the headlamp, the lens being otherwise normally carried by the cover.

DESCRIPTION OF THE PRIOR ART

In fog and other wet atmospheric conditions it is desirable to provide monochromatic light filters over the head lamps of automotive vehicles to shorten the light wavelengths and to diffuse the light. This is because white light normally emitted by commonly known automotive headlamps is projected onto small droplets of water suspended in the air in foggy conditions or upon the rain or snow water particles falling through the air in sufficient density tends to be reflected thereby substantially reducing vision. Monochromatic amber lenses or lens covers have been found to substantially improve vision under such conditions, but under normal conditions obtainable and desirable illumination is reduced to such a level as to produce a driving hazard. Hence, monochromatic filters and lenses have a very limited use, but are extremely beneficial under specific conditions.

Fog lenses commonly know in the art generally comprise an attachable lens fitted to automotive headlamp generally of two types, namely those which are mounted to the headlamp by clips or clamps and those comprising a film sheet statically attached to the lens of the headlamp. In attaching both types of filters, the operator of the automotive vehicle must stop the vehicle and get out into the inclimate weather. In addition automotive vehicle design inherently makes it more desirable to recess the headlamps into the vehicle body to protect the lamps from damage. This makes the attachment of other lenses more difficult if not impossible.

Accordingly, it is an object of the present invention to provide a monochromatic lens filter which may be operable to go into place over the headlamp from a remote position such as from within the automotive vehicle without stopping, and to provide a lens filter which is normally stored in the environment of the headlamp, but out of the path of light emitted by the headlamp.

A further object of the invention is to provide a simple and effective attachment which may be moved into place and removed with ease.

Generally the apparatus of the present invention comprises a roller shadelike monochromatic film sheet mounted to and normally carried by the movable headlight covers commonly used on automotive vehicles to cover the headlamps thereof when the lamps are not in use. The film sheet is provided with a spring-loaded extensible means at one of its terminal ends which is mounted to the cover and with a locking bar means at its opposite terminal end normally held to the cover by a suitable latching means and which is engageable with a locking means fixed to the headlamp housing and operable to hold the sheet in place over the headlamp when the cover is moved out of the path of the headlamp.

Other objects and advantages shall become apparent and a more comprehensive understanding may be had from the detailed description following when read in connection with the following drawings in which:

FIG. 1 is a left rear perspective view of the apparatus of the present invention as viewed from within a commonly known automotive vehicle headlamp housing; and, FIG. 2 is a side elevational view of the invention shown mounted to a commonly known headlamp cover shown in its normally down position in the path of a headlamp; the headlamp cover and the headlamp being shown in dotted lines for illustrative purposes only; and FIG. 3 is a side elevational view of the invention similar to that of Figure 2 except, however, showing the apparatus of the present invention carried by the headlamp cover in its up position out of the path of the headlamp; and, FIG. 4 is a side elevational view of the invention similar to that shown in FIG. 3 except that the monochromatic film sheet is shown locked in the path of the headlamp.

DETAILED DESCRIPTION OF THE PREFERRED EMBODIMENT

Referring now to the drawings, the apparatus of the present invention is generally shown and designated by the numeral 10 in FIG. 1. The apparatus comprises a spring-loaded extensible assembly 11 including a pair of cables 12 and 12' mounted on a commonly known spring-loaded retracting rollers (not shown) journaled for rotation on pins disposed in a pair of housings 13 and 13' at the opposite terminal ends of assembly 11, a frame 14 suitably fastened to the respective terminal ends of the cables 12 and 12' and to one of terminal ends of a monochromatic translucent film sheet lens 15; a latching and locking bar means 16 suitably fastened to the lens 15. Extensible assembly 11 may be suitably mounted to one side of a commonly known automotive vehicle as shown to advantage in FIGS. 2, 3 and 4. The latching-locking bar 16 may be provided with either commonly known magnetic or spring latches (not shown) which are used in connection with cabinet doors. As shown to advantage in FIG. 1 the latching bar 16 comprises an angle bar having a slot 16' through which the lens 15 may pass. In this manner, the bar 16 is normally held in position against the cover 17 and is normally carried thereby. The lens 15 is provided with a pair of latching-locking eyelets 19 and 19' at the opposite terminal sides thereof. The eyelets 19 and 19' are preferrably larger than the slot 16' so that the lens is held by the bar 16 by the eyelets 19 and 19'. The slot 16' of the bar 16 also acts as a lens guide. In practice it has been found to advantage to provide a pair of locking means such as the solenoids 20 which are engageable with the eyelets 19 and 19', although one locking means 20 and one eyelet 19 centrally disposed on the bar 16 may be operable as herein later described. However, the monochromatic film sheet lens 15, if made from flexible material tends to twist and become wrinkled and thereby cause projections of shadows by the light emitted by the headlamp through the lens. It is to be understood that the lens 15 may be made from any monochromatic colored material including rigid materials into which lens grooves may be cut with only slight modification to the apparatus described.

The locking means 20 are fixedly mounted inside the headlamp housing and include a projection 21 which are operable to engage the respective eyelets 19 and 19'. In operation the locking means 20 is operated concurrently with the operating means of the cover 17, and the projections 21 are caused to engage with the eyelets 19 and 19' to cause the latching-locking bar to be unlatched from the cover 17 as the cover is moved out of the path of the headlamp 18. The lens 15 is held in place over the headlamp 18 as shown to advantage in FIG. 4. When the cover 17 is again moved in the path of the lamp 18 the locking means 20 may be operated to retract the projections 21 out of engagement with the eyelets 19 and 19' of the latching-locking bar 16, and the bar 16 may become latched to the cover 17. If the locking means 20 is operated to retract the projections 21 when the cover 17 is in its up position or out of the path of the lamp 18, the lens 15 may be retracted by the cables 12 and 12' being rewound about the spring-loaded spools in the housings 13 and 13', and the lens 15 may then be latched to the cover 17 as hereinbefore described. It is to be understood that the apparatus of this invention may be adapted to horizontal side operating headlamp covers as well as to the vertically operating cover shown.

Having thus described a preferred embodiment of the invention which embodies the teaching and principles of my invention, it is to be appreciated and will be apparent to those skilled in the art that many physical changes could be made on the invention without altering the inventive concepts embodied therein. Hence, it is intended that the scope of the invention be limited only to the extent indicated by the appended claims.

I claim:

1. In a fog penetrator lens for motor vehicles, the combination of a monochromatic lens mounted by extensible means to a retractable automotive headlamp cover, said lens and said extensible means being carried by said cover, a latching means suitably fastened to said lens and said cover and disposed between said lens and said cover at one of the terminal ends thereof opposite said extensible means and operable to normally hold said lens to said cover, and a lens locking means engageable with said lens and mounted in the housing of an automotive headlamp operable to selectively engage said lens from said cover and cause the said lens to be unlatched from said latching means to hold the said lens in place over the headlamp as said cover is moved out of the path of the headlamp.

2. The apparatus of claim 1 including extensible means comprising a pair of housings mounted at opposite terminal sides of the cover each having a spring-loaded roller journaled for rotation on a pin carried by said housing, and a cable carried by said roller suitably fastened at one terminal end to said lens and at the opposite end to said roller; and a latching means comprising a slotted angle portion suitably fastened to the cover at the terminal end opposite said extensible means operable to guide said lens through the slotted portion thereof, a lens locking portion suitably fastened to said lens at the terminal end opposite said extensible means, said lens locking portion being larger than said slotted portion of said latching means and operable to stop the travel of said lens through said latching means.

3. The apparatus of claim 2 wherein said lens locking means comprises an eyelet operable to be selectively engaged by a solenoid mounted in said automotive headlamp housing.